United States Patent
Leech et al.

(10) Patent No.: US 6,468,575 B2
(45) Date of Patent: Oct. 22, 2002

(54) METHOD FOR MOLDING AND SHAPING TONGUE

(75) Inventors: Les Leech; Kohei Nomura; Keizo Ogawa; Ken Johnson; Jeff Brindley, all of Fremont, NE (US)

(73) Assignee: Fremont Beef Company, Fremont, NE (US)

( * ) Notice: Subject to any disclaimer, the term of this patent is extended or adjusted under 35 U.S.C. 154(b) by 0 days.

(21) Appl. No.: 09/776,977

(22) Filed: Feb. 5, 2001

(65) Prior Publication Data

US 2002/0106433 A1 Aug. 8, 2002

(51) Int. Cl.⁷ .............................. A23L 1/31; A23P 1/10
(52) U.S. Cl. ..................................................... 426/513
(58) Field of Search ................. 426/513, 524; 452/142

(56) References Cited

U.S. PATENT DOCUMENTS

| 4,338,704 A | * | 7/1982 | Welton et al. ............... 426/524 |
| 6,042,467 A | * | 3/2000 | Leech et al. ............ 452/142 X |

* cited by examiner

*Primary Examiner*—Arthur L. Corbin
(74) *Attorney, Agent, or Firm*—Mark Frederiksen

(57) ABSTRACT

A tongue rack includes a frame with a plurality of troughs supported on the frame. Each trough is generally U-shaped in cross-section and sloped, with the open upper end of the trough located above a closed lower end of the trough. A tongue placed in the trough will shorten in length and increase in thickness as it is chilled. The method of the invention includes extracting a beef tongue from an animal and positioning the tongue into the sloped trough with the base end of the tongue against the closed end of the trough and the tipped end of the tongue proximal the open end of the trough, prior to rigor mortis setting in on the tongue.

4 Claims, 3 Drawing Sheets

METHOD FOR MOLDING AND SHAPING TONGUE

CROSS-REFERENCES TO RELATED APPLICATIONS (Not applicable)

STATEMENT AS TO RIGHTS TO INVENTIONS MADE UNDER FEDERALLY SPONSORED RESEARCH AND DEVELOPMENT (Not applicable)

BACKGROUND OF THE INVENTION (1) Field of the Invention

The present invention relates generally to a rack for forming and shaping tongue to a desirable shape for resale, and more particularly to an improved tongue shaping rack and method of use.

(2) Background Information

Beef tongue is considered a delicacy by many people in this country, as well as in many foreign countries. Preferably, the product is served in sliced form, sliced transversely to the length of the product. The shape of each slice is generally rectangular, but a slice with greater width and height dimensions commands a better selling price than a slice which is much greater in width than in height.

In addition, a uniform tongue shape permits better conditions for skinning and slicing.

BRIEF SUMMARY OF THE INVENTION

It is therefore a general object of the present invention to provide an improved rack for forming and shaping tongues during chilling.

Another object of the present invention is to provide a tongue rack which will mold a tongue into a desired shape for skinning and slicing.

A further object is to provide a method for processing tongue to provide a desirable and marketable sliced product.

These and other objects of the present invention will be apparent to those skilled in the art.

The tongue rack of the present invention includes a frame with a plurality of troughs supported on the frame. Each trough is generally U-shaped in cross-section and sloped, with the open upper end of the trough located above a closed lower end of the trough. A tongue placed in the trough will shorten in length and increase in thickness as it is chilled. The method of the invention includes extracting a beef tongue from an animal and positioning the tongue into the sloped trough with the base end of the tongue against the closed end of the trough and the tipped end of the tongue proximal the open end of the trough, prior to rigor mortis setting in on the tongue.

BRIEF DESCRIPTION OF THE SEVERAL VIEWS OF THE DRAWING

The preferred embodiment of the invention is illustrated in the accompanying drawings, in which similar or corresponding parts are identified with the same reference numeral throughout the several views, and in which.

DETAILED DESCRIPTION OF THE INVENTION

Figure 1:
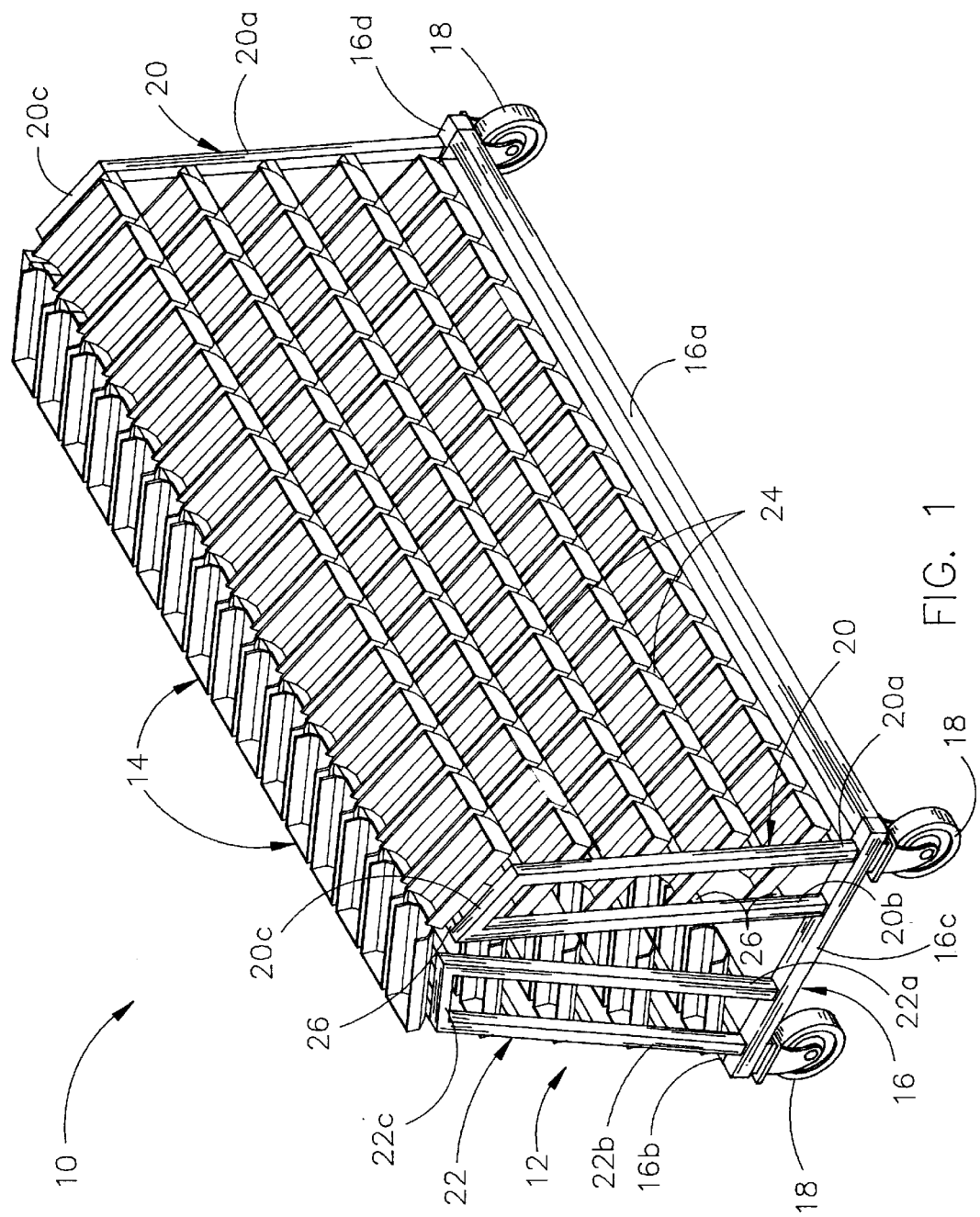
FIG. 1 is a perspective view of the tongue rack of the present invention.

Referring now to the drawings, and more particularly to FIG. 1, the tongue rack of the present invention is designated generally at 10 and includes a wheeled frame 12 supporting a plurality of troughs 14.

Frame 12 includes a generally rectangular tubular base 16 with wheels 18 mounted at each corner, to permit the frame to roll on the ground. Base 16 includes forward and rearward members 16a and 16b, and opposing side members 16c and 16d. A forward and rearward upright 20 and 22 respectively are mounted on side members 16c and project upwardly therefrom. A corresponding pair of forward and rearward uprights 20 and 22 are also mounted on side member 16d and project upwardly therefrom. Uprights 20 include forward and rearward posts 20a and 20b, connected at their upper ends by a short connector member 20c. Similarly, rearward upright 22 includes forward and rearward posts 22a and 22b connected at their upper ends by connector piece 22c.

Each forward post 20a of forward uprights 20 are connected by a plurality of vertically spaced and parallel bars 24. Each bar 24 forms the forward end of a support shelf for supporting troughs 14, as described in more detail hereinbelow. A plurality of vertically spaced parallel rearward bars 26 interconnect the rearward posts 20b of forward uprights 20, to form the rearward support of a plurality of shelves for troughs 14.

Figure 2:
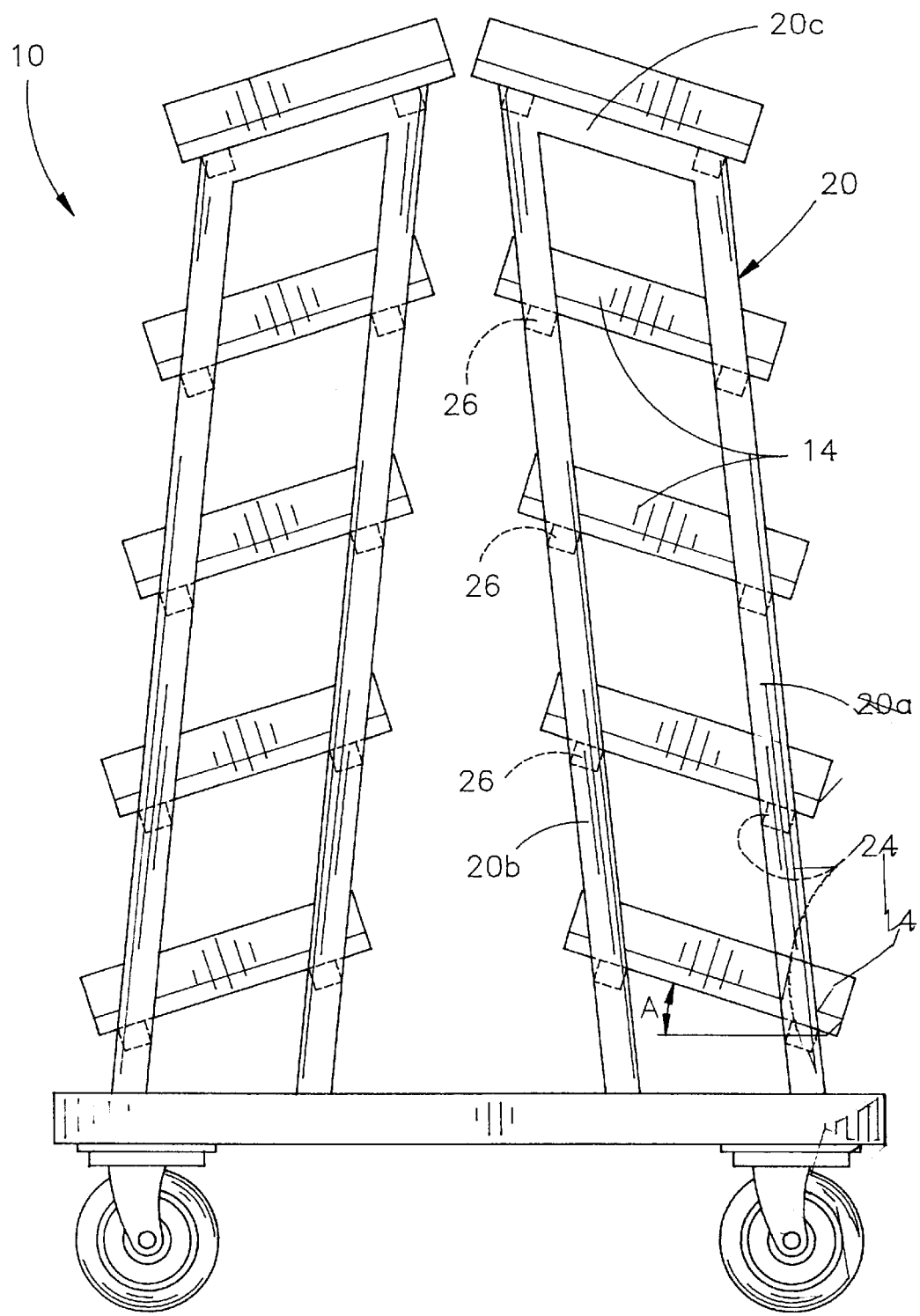
FIG. 2 is an end elevational view of the rack.

Referring now to FIG. 2, each forward bar 24 is correlated to a rearward bar 26, to form a plurality of support shelves for supporting a series of troughs 14. Each corresponding pair of forward and rearward bars has the forward bar 24 positioned vertically below the rearward bar 26, so that each trough 14 supported on a pair of bars is oriented at a slope relative to horizontal. This slope angle A is preferably in acute angle less than 45° and greater than 0° (horizontal). Experimentation has shown the preferred angle to be approximately 12°–15°, to achieve the best results.

Figure 3:
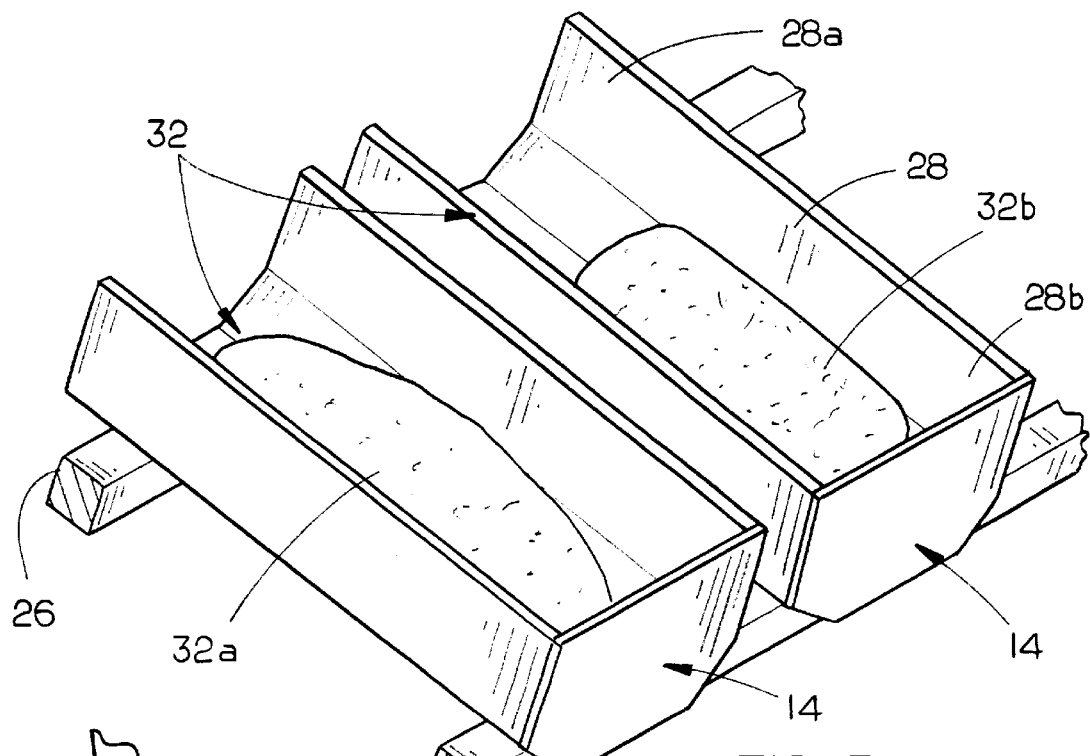
FIG. 3 is an enlarged perspective view of a pair of troughs of the rack.
Figure 4:
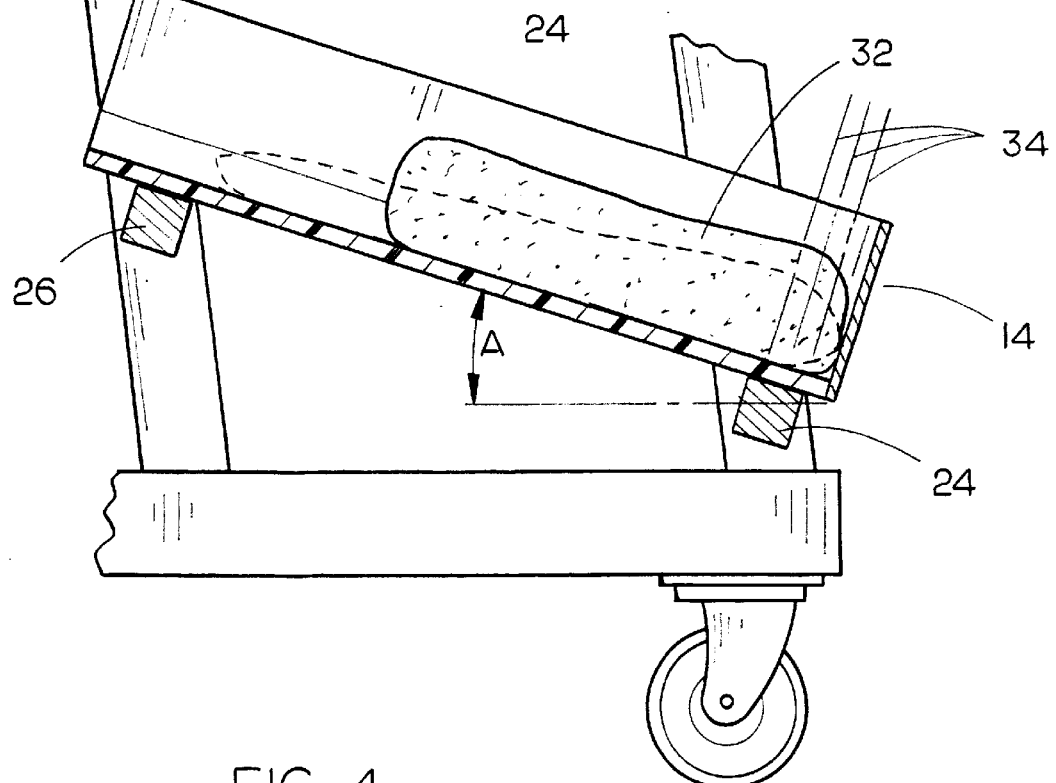
FIG. 4 is an enlarged end elevational view with a trough shown in section.

Referring now to FIGS. 3 and 4, each trough 14 includes a generally U-shaped channel 28 which is open at an upper end 28a and closed by an end plate 30 at the lower end 28b. Channel 28 and end plate 14 are preferably formed of stainless steel or other material utilized in food handling.

Each trough 14 is attached to and extends between a pair of forward and rearward bars 24 and 26 with the open upper end 28a positioned on rearward bar 26 and the lower end 28b positioned on a forward bar 24. As previously noted, each rearward bar 26 is positioned at a height vertically above the height of the associated forward bar 24, such that each trough 14 is tipped at an angle A relative to horizontal, and with open upper end 28a tipped upwardly. The angle is important in the molding of the tongue 32 into the desired shape and size for skinning and slicing.

In the typical processing of beef tongue, the tongue is chilled immediately after extraction from the animal. Because the extracted tongue is non uniform in size and shape, and is generally narrow and elongated (as shown in dash lines in FIG. 4 and in solid lines as tongue 32a in FIG. 3), it is difficult to skin the tongue, and the slices are undesirably narrow and small in shape. FIG. 4 has slice lines 34 indicated thereon, showing how the tongue is preferably sliced normal to the longitudinal axis of the tongue and perpendicular to the "grain" of the tongue. It can also be seen that the slices of the "unformed" tongue, shown in dashed lines in FIG. 4, are shorter in height than are slices of the "formed" tongue shown in solid lines in FIG. 4.

The inventors herein have found that positioning the tongue in a trough 14 with the base positioned adjacent end plate 14 and the tip positioned adjacent the upper end 28a, immediately after extraction will allow gravity to cause the tongue to take on the shape of the trough and shorten and fatten up the overall shape of the tongue. The tongue is quite flexible and "moldable" for about 30–60 minutes after extraction, before rigor mortis sets in. It is during this time period that the tongue is placed in troughs 14 for molding and chilling.

The angle A at which each trough 14 is tipped is important, because it has been found that too steep of an angle will cause the grain of the tongue to be oriented at an angle, and cause the tongue to be too short and fat for desirable slicing. Because the angle of the grain is changed, the slices are not oriented at the desired 90° angle, producing an inferior and less marketable product.

In general, the inventors have found that a 45° slope is too steep, and that the preferable slope angle is approximately 12°–15° above horizontal.

The inventors have also found that the apparatus and method of the present invention increase the yield of product being processed. As noted above, the tongue is immediately chilled after extraction from the animal. In the prior art this is accomplished by hanging the product from a hook. Two detrimental effects result from this prior art method. First, the product becomes more elongated. Second, air almost completely surrounds the product, thereby causing the product to dry out, resulting in a weight loss of about 1.6% to 1.7%.

When the product is positioned in the sloped troughs of the present invention, the two detrimental results described above are beneficially affected. First, the tongue is actually compressed slightly in length. Thus, when the tip is cut off during further processing, less tip is actually removed.

Second, because less surface area is exposed to the air during chilling, the product will not dry out as much, and less weight loss will occur. The weight loss during the cooling process, using the method and apparatus of the present invention is approximately 0.7%—less than half the weight loss of the prior art process. An increase in product quantity and reduced weight loss results in a beneficial increase in product yield.

Whereas the invention has been shown and described in connection with the preferred embodiment thereof, many modifications, substitutions and additions may be made which are within the intended broad scope of the appended claims.

What is claimed is:

1. A method for molding the shape of a beef tongue, comprising the steps of:

extracting a beef tongue from an animal; and positioning the extracted tongue into a sloped trough prior to rigor mortis setting in;

the trough being of a shape, size, and slope to cause the length of the tongue to shorten, the thickness of the tongue to increase, and the width of the tongue to remain the same, as the tongue rests in the trough for a period of time.

2. The method of claim 1, wherein the trough is generally U-shaped and sloped from an open upper end to a closed lower end, and wherein the step of positioning the tongue includes positioning the tongue with a base end abutting the trough closed end and a tip end proximal the trough open end.

3. A method for decreasing weight loss during chilling of a beef tongue, comprising the steps of:

extracting a beef tongue from an animal; and positioning the extracted tongue into a trough with at least a lower surface of the tongue in contact with an upper surface of the trough.

4. The method of claim 3, wherein the trough includes a pair of upright sides, and wherein the positioning step includes positioning the tongue in the trough with opposing sides of the tongue in contact with the trough sides.

* * * * *